United States Patent [19]

Yamamoto

[11] Patent Number: 4,488,169
[45] Date of Patent: Dec. 11, 1984

[54] DIGITAL CHROMAKEY APPARATUS
[75] Inventor: Kaichi Yamamoto, Zama, Japan
[73] Assignee: Sony Corporation, Tokyo, Japan
[21] Appl. No.: 396,339
[22] Filed: Jul. 8, 1982
[30] Foreign Application Priority Data
  Jul. 9, 1981 [JP] Japan .................................. 56-107420
  Jul. 9, 1981 [JP] Japan .................................. 56-107421
[51] Int. Cl.³ ............................................ H04N 9/535
[52] U.S. Cl. ..................................................... 358/22
[58] Field of Search ........................ 358/22, 183, 21 R
[56] References Cited
  U.S. PATENT DOCUMENTS
  4,386,363  5/1983  Morrison ................................ 358/22
  4,389,664  6/1983  Robitzsch .............................. 358/22
  4,396,939  8/1983  Kitahama ............................... 358/22
  4,408,221 10/1983  McCoy .................................. 358/22

Primary Examiner—Michael A. Masinick
Attorney, Agent, or Firm—Lewis H. Eslinger; Alvin Sinderbrand

[57] ABSTRACT

In a digital chromakey apparatus, a digital key signal is generated in response to specified chroma information of first digital video signal designating a foreground scene and the first digital video signal is switched into second digital video signal designating a background scene in accordance with level of the digital key signal. According to this invention, the digital key signal is adjusted or compensated in level at portions of leading and trailing edges thereof so as to expand or compress the area of chromakey.

13 Claims, 42 Drawing Figures

F I G. 2A
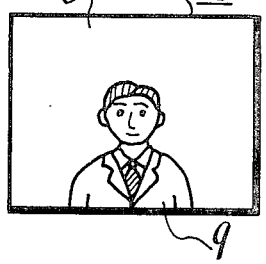
F I G. 2B
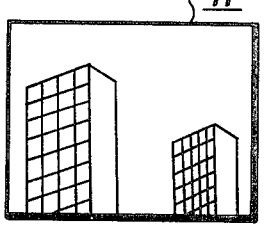
F I G. 2C
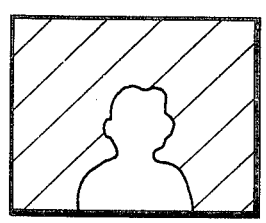
F I G. 2D
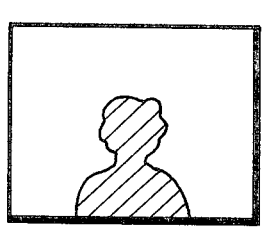
F I G. 2E
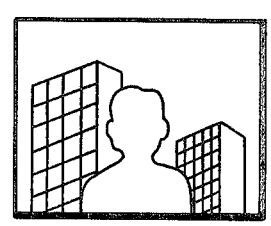
F I G. 2F
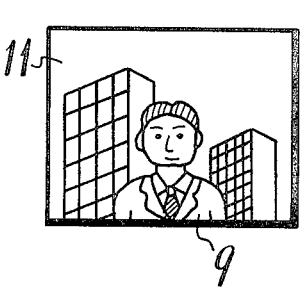

F I G. 4
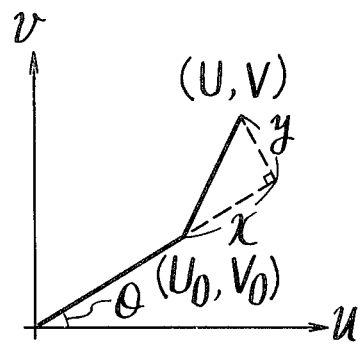
F I G. 7A
F I G. 7B (H KEY)
F I G. 7C (S KEY)
F I G. 7D (S KEY')
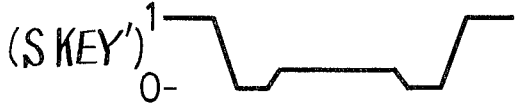
F I G. 8
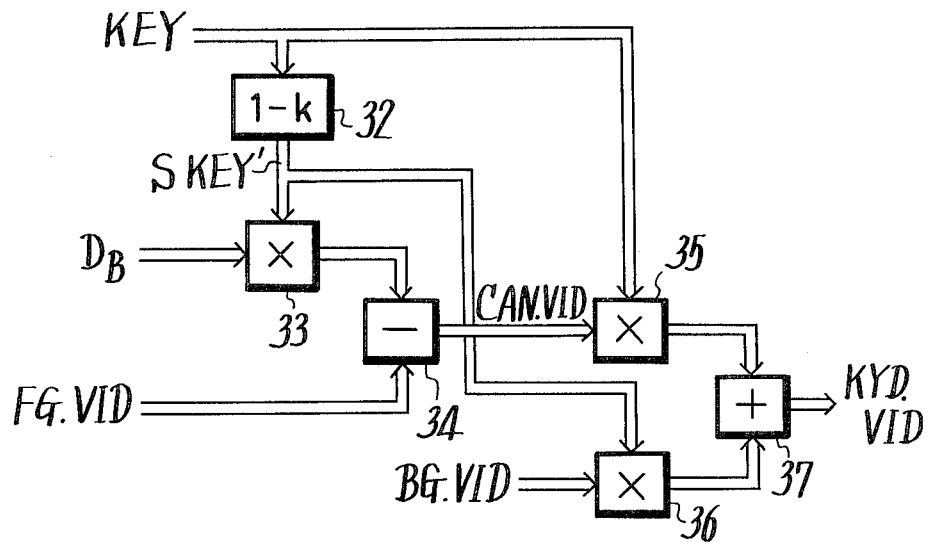

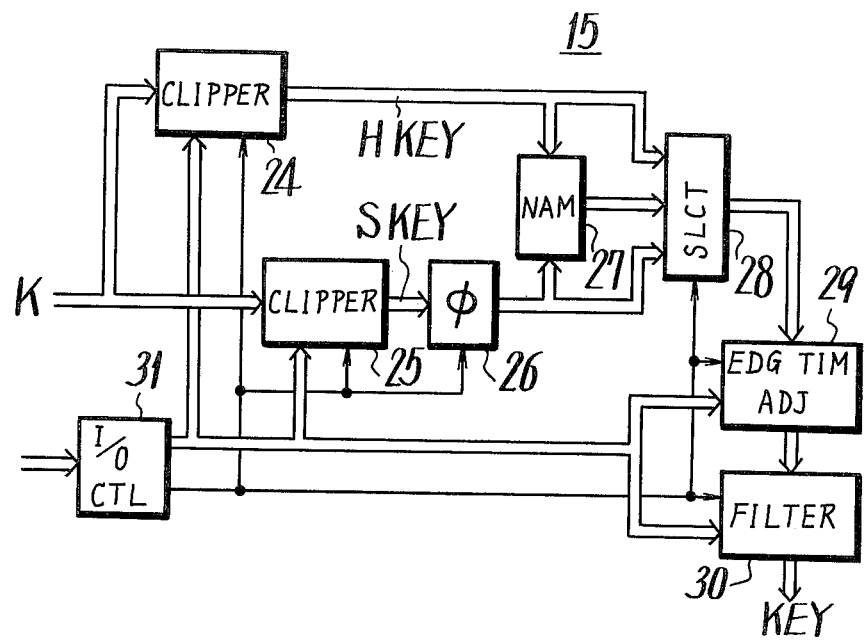
FIG. 5
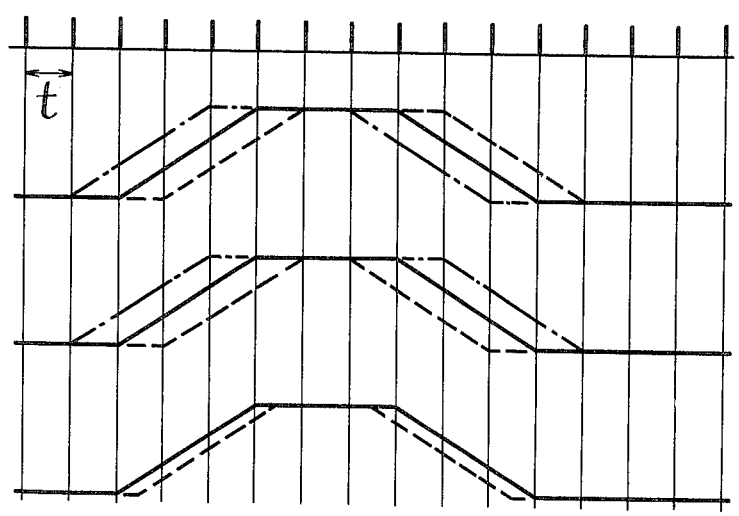
FIG. 6A
FIG. 6B
FIG. 6C
FIG. 6D

FIG. 11A (CK)
FIG. 11B (PRE) (PRE') (MID) (FLW)
FIG. 11C (EAK)
FIG. 11D (CT) (UP) (DW)
FIG. 11E (GT)
FIG. 11F (TK₂) (TK₁) (HLD)

DIGITAL CHROMAKEY APPARATUS

BACKGROUND OF THE INVENTION

1. Field of the Invention

The invention relates generally to a digital chromakey apparatus. More particularly, although not exclusively, this invention relates to a digital chromakey apparatus in which a key signal can be adjusted to compensate boundary between foreground scene and background scene to be inserted.

2. Description of the Prior Art

A known digital video signal processing apparatus such as a digital chromakey apparatus and a digital montage apparatus has to form a key signal corresponding to a part of areas in one picture. The reason for this is as follows. The known chromakey apparatus is of a construction as shown in FIG. 1. In the figure, references 1 and 2 denote color television cameras, each of which is used to take pictures of foreground and background. References 3 and 4 denote gate circuits to which foreground and background color video signals are respectively supplied. Reference 5 denotes a key signal generator to generate and supply the key signal to the gate circuits 3 and 4. Reference 6 denotes a mixer to mix the outputs of the gate circuits 3 and 4 produce the mixed output at an output terminal 7.

By way of example, as shown in FIG. 2A, a foreground 10 in which an object 9 (for example, human figure) is positioned in front of a back screen 8 painted with a back color of, for example, blue is photographed or picked up by the color television camera 1 and then, the key signal generator 5 calculates three primary color components R, G and B in the above foreground color video signal so as to convert the color phase difference to the amplitude difference thus forming the key signal. In other words, as shown in FIG. 2C, the key signal which makes the gate ON only in the part of the object 9 is formed and supplied to the gate circuit 3, while as shown in FIG. 2D, the key signal which makes the gate ON only in the part other than the object 9 is formed and then supplied to the gate circuit 4. Therefore, the background picture 11 photographed by the television camera 2 as shown in FIG. 2B, is cored by the part corresponding to the object 9 in the gate circuit 4 and the picture signal shown in FIG. 2E is mixed with the picture signal, indicating the object 9.

Thus at the output terminal 7 there is generated a picture signal in which the object 9 is inserted into the background 11 as shown in FIG. 2F.

But, in such prior art chromakey apparatus, the edge portions of the key signal thus produced do not always correspond to the boundary or border between the back screen 8 and the object 9. To cope with the above aspect, the timings of the edge portions of the key signal have to be adjusted.

OBJECTS AND SUMMARY OF THE INVENTION

Accordingly, it is an object of the invention to provide an improved digital chromakey apparatus which can obviate the aforesaid defects inherent to a prior art digital chromakey apparatus.

It is another object of the invention to provide a digital chromakey apparatus which is capable of adjusting each timing of leading and trailing edges of digital key signal.

It is a still another object of the invention to provide a digital chromakey apparatus which is capable of adjusting each timing of edge portions of digital key signal in a range corresponding to integer time a sampling frequency of digital key signal, and also in a range narrower than one period of the sampling period.

According to an aspect of the invention, a digital chromakey apparatus comprises means for generating a digital key signal in response to specified chroma information of first video signal designating a foregound picture, means for switching the first video signal into second digital video signal designating a background picture in accordance with level of the digital key signal and means for adjusting or compensating in level at leading and trailing edge portions of the digital key signal in order to expand or compress an chromakey area.

The other objects, features and advantages of the invention will become apparent from the following description taken in conjunction with the accompanying drawings through which the like references designate the same elements and parts.

BRIEF DESCRIPTION OF THE DRAWINGS

FIGS. 2A through 2F are respectively schematic diagrams useful for explaining the operation of the same;

FIG. 4 is a graph used to explain how a key signal is generated;

FIG. 5 is a block diagram schematically showing an arrangement of a key processor;

FIGS. 6A through 6D and FIGS. 7A through 7D are respectively waveform diagrams used to explain the key processor;

FIG. 8 is a block diagram schematically showing outline construction of a color canceller and a mixer;

DESCRIPTION OF THE PREFERRED EMBODIMENTS

Embodiments of the invention will hereinafter be described by way of example with reference to the drawings, in which a digital key signal adjusting apparatus of the invention is applied to a digital chromakey apparatus intended for a digital video signal of Y, U and V signal systems.

Figure 1:
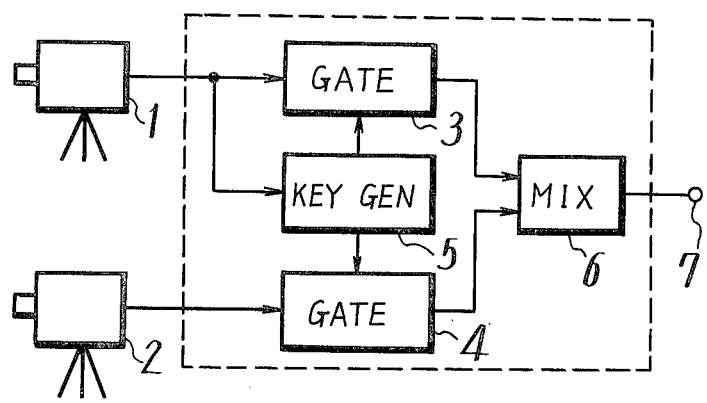
FIG. 1 is a block diagram schematically showing an outlined construction of a known chromakey apparatus.
Figure 3:
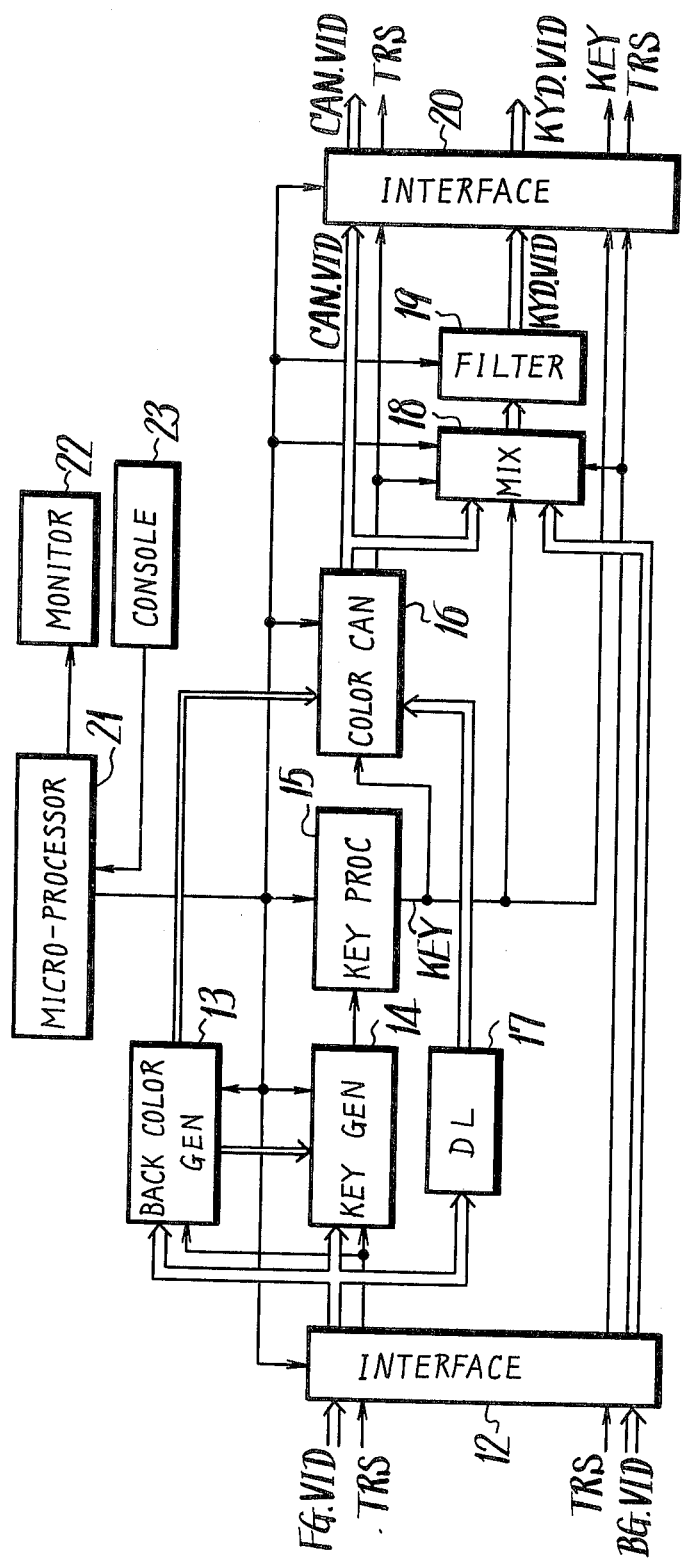
FIG. 3 is a block diagram schematically showing an entire construction of a digital chromakey apparatus according to one embodiment of the invention.

FIG. 3 is a block diagram showing an overall arrangement of a digital chromakey apparatus. In the figure, reference 12 denotes an interface to which a foreground color video data FG. VID and a background color video data BG. VID each being together with a timing reference signal TRS are supplied. The above color video data FG. VID and BG. VID are formed of respective components provided by sampling a luminance signal Y and color difference signals U and V, each of which is formed by matrix calculation of output signals R, G and B from a color television camera, at the sampling frequency ratio of, for instance, 14 : 7: 7. The interface 12 takes the timing signals (horizontal sync. signal, vertical sync. signal and the like) decoded from the respective timing reference signals TRS into consideration, then makes the phases of two color video data FG. VID and BG. VID appropriate ones, and then delivers the same to the next stage.

Reference 13 denotes a back color data generator which forms a back color data from the foreground color video data FG. VID and supplies the same to a key signal generator 14 and a color canceller 16.

The key signal generator 14 compares the back color data with the foreground color video data FG. VID at every corresponding sample thereof to allow the generation of a key signal with a predetermined level. Since the key signal per se thus developed has so much external disturbances, it can not be utilized as it is or immediately. Therefore, as will be discussed later, the key signal is supplied to a key processor 15, whereby it is subjected to waveform shaping processes such as clipping, adjustment of edge timings of this clipped output, adjustment of gain and the like. Thus the key processor 15 produces a key signal KEY.

The color canceller 16 eliminates the back color from the foreground color video data FG. VID on the basis of the above key signal KEY. For instance, when the object 9 (FIGS. 2A to 2F) is transparent, the transparent back color is removed. To be more concrete, the back color data is amplitude-modulated by the key signal KEY so as to subtract the modulated output from the foreground color video data FG. VID. The elimination of the back color is intended for only the color difference signals U and V, while the luminance signal Y is merely passed through the color canceller 16.

The color canceller 16 is supplied with the foreground color video data FG. VID by way of a delay circuit 17. The delay circuit 17 has a delay time corresponding to the time needed by the key processor 15 in its waveform shaping processes mentioned before.

An output CAN. VID of the color canceller 16 and the background color video data BG. VID are supplied to a mixer 18, in which both of them are mixed to each other on the basis of the key signal KEY applied thereto. Other than a method for simply switching two color video data CAN. VID and BG. VID to one other, the above mixing operation can use a so-called cross fade method in which at the boundary to between the two data fields, the level of one data is gradually decreased, while the level of the other data is gradually increased. The output of the mixer 18 is supplied through a digital filter 19 to an interface 20. The digital filter 19 serves to shape the waveform of the output derived from the mixer 18.

The interface 20 permits the color video data CAN. VID, the colors of which are removed and derived from the color canceller 16, the mixed color video data KYD. VID from the digital filter 19, the respective timing reference signals TRS and the key signal KEY to be developed to the outside.

In addition, a microprocessor 21, a CRT (cathode ray tube) monitor 22 and a console 23 are provided, in which the translation of a user key input from the console 23, the transfer of the above translation into the inside of the system, the calculation processings required by respective circuit blocks and the like are possible.

The aforesaid digital chromakey apparatus operates at the sampling clock with the frequency corresponding to the sampling rate of the color difference data.

There are proposed some methods for processing the data in the key signal generator 14. For example, as illustrated in FIG. 4. reference points $U_0$ and $V_0$ corresponding to the back color are plotted on an u - v chromaticity coordinate, and a primary coupling $(K=|X|+|Y|)$ of projection components x and y of momentary values U and V of the foreground color video data FG. VID relative to a new coordinate prepared based upon the above reference points $U_0$ and $V_0$ is calculated so as to generate the key signal, where $$x=(U-U_0)\cos\theta+(V-V_0)\sin\theta$$

$$y=(V-V_0)\cos\theta-(U-U_0)\sin\theta$$

FIG. 5 schematically shows the arrangement of the key processor 15, in which a key signal K from the key signal generator 14 is supplied to clippers 24 and 25. The clipper 24 generates a key signal HKEY for hard keying, while the clipper 25 generates a key signal SKEY for soft keying. The key signal HKEY is supplied to a non-additive mixer 27 and a selector 28, while the other key signal SKEY is supplied through a phase shifter 26 to the non-additive mixer 27 and the selector 28 likewise. The non-additive mixer 27 compares the values of the two key signals HKEY and SKEY and permits either of the larger ones to be produced therefrom.

The key signal derived from the selector 28 is supplied to an edge timing adjusting circuit or adjuster 29 in which the timing at the edge, namely, the portion having the slope is adjusted. This edge timing adjuster 29 is of a construction capable of adjustment taking a sampling period t of a clock shown in FIG. 6A as a unit and adjustment during this sampling period t. The edge timing adjuster 29 has the following modes of the adjustment. A shift mode for shifting the key signal in parallel with the unit of the clock period t as shown in FIG. 6B; a coarse adjustment mode for contracting the edge to the inside or expanding the same to the outside with the unit of the clock period t as shown in FIG. 6C; and a fine adjustment mode for contracting the edge within the clock period t as shown in FIG. 6D. Further details of this edge timing adjuster 29 will be described later.

The key signal derived from the edge timing adjuster 29 is developed as the key signal KEY at the output thereof via a filter 30. The filter 30 allows the influence of the quantizing error in the key signal processings from the preceding stage to be reduced, and restricts the band of the key signal KEY in such manner that no aliasing noise will occur when the video signal is modulated by the key signal KEY in the mixer 18.

For the control and calculation processings of the key processor 15 as described above, data, addresses and control signals, each being passed through an I/0 controller 31 are supplied to the respective circuits in the key processor 15.

The hard and soft keying operations will be described briefly with reference to FIGS. 7A through 7D. When the foreground 10 where the object 9 of, for example, the transparent glass is put in front of the back screen 8 is picked up, the back color is seen through the center of the glass so that as shown in FIG. 7A, a signal K whose level is increased in association with the outline of the object 9 and is reduced at the center of the glass is derived from the key signal generator 14. Although FIGS. 7A through 7D represent conveniently the key signal as the analog waveform for the sake of the explanation, the key signal is digital data since the aforesaid digital chromakey apparatus in fact deals with the data in which one sample of 8 bits is sequentially arrayed at each sampling period t. The clipper 24 executes the clipping operation which takes base clipping level BL and peak clipping level PLh as threshold levels so as to generate the hard keying key signal HKEY as shown in FIG. 7B. Whereas, the clipper 25 excutes the clipping operation which takes base clipping level BL and peak clipping level PLs (peak clipping level PLs is greater than the peak clipping level PLh) as threshold levels thus generating the soft keying key signal SKEY as shown in FIG. 7C.

As stated above, in case of the transparent object 9, the soft keying operation is capable of generation of the key signal corresponding satisfactorily to the back color seen through or the reflected light from the back screen 8 impinged on the object 9.

FIG. 8 shows in block diagram form the principle of the color cancellation and mixing operations done by the use of the key signal KEY. Initially, let us assume that the range of the level of the key signal KEY from its minimum value to the maximum value be 1 and the relative level of the momentary value thereof be k. Then the key signal KEY is converted to $(1-k)$ when it is supplied to a calculation circuit 32. Taking the key signal SKEY shown in FIG. 7C as an example, the key signal SKEY is converted to a key signal SKEY' shown in FIG. 7D. This key signal SKEY' is supplied to a multiplier 33 so as to modulate the back color signal $D_B$ derived from the back color data generator 13 (FIG. 3). The output of the multiplier 33 is supplied to a subtractor 34 thereby subtracted from the foreground color video data FG. VID. Thus the subtractor 34 derives the video data CAN. VID which is such that when the color video data FG. VID is removed, the data which remains corresponds with the object 9 and the back color of the object 9. The aforesaid operations are all performed by the color canceller 16 in FIG. 3.

Moreover, in the multiplier 35 the video data CAN. VID is modulated by the key signal SKEY and in the multiplier 36 the background video data BG. VID is modulated by the key signal SKEY'. Then, the outputs of both the multipliers 35 and 36 are added to each other in an adder 37. The output video data KYD. VID of the adder 37 affects the picture such that the background picture becomes transparent when the object 9 is transparent as described previously. Owing to the slope of the edge of the key signal KEY, at the boundary between the object 9 and the background 11, the cross fade is performed to incur the gradual switchings of the pictures from one to another thus rendering the boundary of the pictures quite natural.

The edge timing adjuster 29 included in the key processor 15 will be described in detail with reference to FIG. 9.

The edge timing adjuster 29 includes a shift and coarse adjusting circuit 38 supplied with the digital key signal KEY of 8 bits per one sample from the selector 28 (FIG. 5) and a fine adjusting circuit 39 provided at the next stage thereof shown by a broken line block. In this case, a control logic circuit 40 is common to both of the above circuits 38 and 39. The control logic circuit 40 is supplied with the data and the control signal from the microprocessor 21 (FIG. 3) through the I/0 control circuit 31, whereby shift amount, coarse adjustment ON/OFF, fine adjustment ON/OFF, switching of the development or contraction, the adjusting amount and so on are controlled.

First of all, the shift and coarse adjusting circuit 38 will be described, which includes three RAMs (random access memories) 42, 43 and 44. Since in this example, the shift or adjustment at 4-clock period at maximum is possible, each of the RAMs 42, 43 and 44 has the capacity of 4 samples. The RAM 42 is for the shifting mode, the RAM 43 is for the coarse adjustment of the leading edge and the RAM 44 is for the coarse adjustment of the trailing edge. The write operations of the RAMs 42, 43 and 44 are commonly controlled by a write address WA generated from the control logic circuit 40.

Also, the RAM 42 is supplied with a read address $RA_0$ generated from the control logic circuit 40. The write and read of each of the RAMs 42, 43 and 44 is possible during one memory cycle. The RAM 42 is so controlled in address that a difference is provided between the write address WA and the read address $RA_0$ so as to produce an output in which the input key signal KEY is shifted by one to four clock periods.

The RAMs 43 and 44 are respectively supplied with read addresses $RA_1$ and $RA_2$, each being generated from the control logic circuit 40. Then, controlling the read addresses $RA_1$ and $RA_2$ so as to make the delay times of the RAMs as predetermined ones specifies the amount of the expansion or contraction.

The output of the RAM 42 is supplied to the RAM 43 via a latch 45 and is also supplied to the RAM 44 via latches 46, 47 and 48. Each of the latches shown in FIG. 9 produces the delay time of one sampling clock. Consequently, the data written in the RAM 43 advances in phase more than an output MID of the latch 48. The output of this RAM 43 is supplied through latches 49 and 50 to a latch 56 in the fine adjusting circuit 39. Also, the output of the RAM 44 is supplied through latches 51 and 52 to the latch 56 in the fine adjusting circuit 39. In this case, control signals $TK_1$, $TK_2$ and HLD derived from the control logic circuit 40 are respectively supplied to the latches 50, 52 and 56, by which in view of the movement of the waveform of the key signal, one of the outputs of either the latch 50 or the latch 52 is selected and the data renewal of the latch 56 is stopped.

The leading and trailing edges indicating the movement of the waveform are detectable by comparing an output PRE of the latch 49 with an output PRE', which is provided by delaying the output PRE by one clock through a latch 53, in a level comparator 54. In other words, the level comparator 54 produces a detecting signal CT which becomes "H" when the levels of both outputs are equal and stays in the flat regions, a detecting signal UP which becomes "H" at the rising slope (PRE > PRE'), that is, the leading edge, and a detecting signal DW which becomes "H" at the falling slope (PRE < PRE'), that is, the trailing edge and then these detecting signals are supplied to the control logic circuit 40. In the above level comparison, it is more practical to use upper 6 bits of the output PRE of the latch 49 so as to widen the range for judging the flat region of the level. These detecting signals CT, UP and DW are synchronized with the output PRE of the latch 49. Moreover, a level comparator 55 is provided to compare the output PRE of the latch 49 with an output FLW of the latch 51 in level, whereby a detecting signal GT is generated by the level comparator 55. This detecting signal GT is employed so as to avoid the unnatural waveforms of the edge portions caused by the expansion or contraction upon coarse adjustment. This level comparator 55 is supplied with a mode switching signal through the I/0 controller 31, whereby a detecting signal GT, which becomes "H" when the output FLW is greater than or equal to the output PRE (FLW ≧PRE) in the expansion mode and which becomes "H" when the output FLW is greater than the output PRE (FLW >PRE) in the contraction mode, is generated from the level comparator 55.

In the shift and coarse adjusting circuit 38, when the coarse adjustment is OFF, the control signal $TK_1$ is put into "L" and the control signal $TK_2$ is put into "H" by the instruction from the microprocessor 21 (FIG. 3) so that the key signal read out from the RAM 44 is always supplied through the latches 51 and 52 to the latch 56. Thus by the control of the read address $RA_0$ for the write address WA in the RAM 42, it is possible to shift (delay) the key signal KEY by some integer times the period of the sampling clock.

Also, in the ON state of the coarse adjustment, the microprocessor 21 (FIG. 3) issues the command of the expansion or contraction and the amount thereof, and these instructions or commands are supplied to the control logic circuit 40 and the operation mode of the level comparator 55 is switched. To be more precise, the control logic circuit 40 generates the control signals $TK_1$, $TK_2$ and HLD on the basis of the logical expression as follows.
In expansion:

$TK_1 = UP \cdot \overline{GT}$ $TK_2 = DWM \cdot GT$ $HLD = \overline{TK_1 + TK_2}$ In contraction:

$TK_1 = DW \cdot GT$ $TK_2 = UPM \cdot GT$ $HLD = \overline{TK_1 + TK_2}$ where DWM and UPM represent respectively the detecting signals DW and UP delayed by the phase differences of the outputs PRE and FLW. The control amounts of the expansion and the contraction are determined by how much phase difference the outputs PRE and FLW of the latches 49 and 51 specified by the read addresses $RA_1$ and $RA_2$ supplied from the control logic circuit 40 have relative to the output MID of the latch 48. In expansion, the leading edge of the output PRE and the trailing edge of the output FLW are selected by the control signals $TK_1$ and $TK_2$, while in contraction, the leading edge of the output FLW and the trailing edge of the output PRE are selected by the control signals $TK_1$ and $TK_2$. Therefore, controlling the phase differences of the outputs PRE and FLW against the output MID can make it possible to control the expansion or contraction amount of the leading and trailing edges independently.

Figure 10:
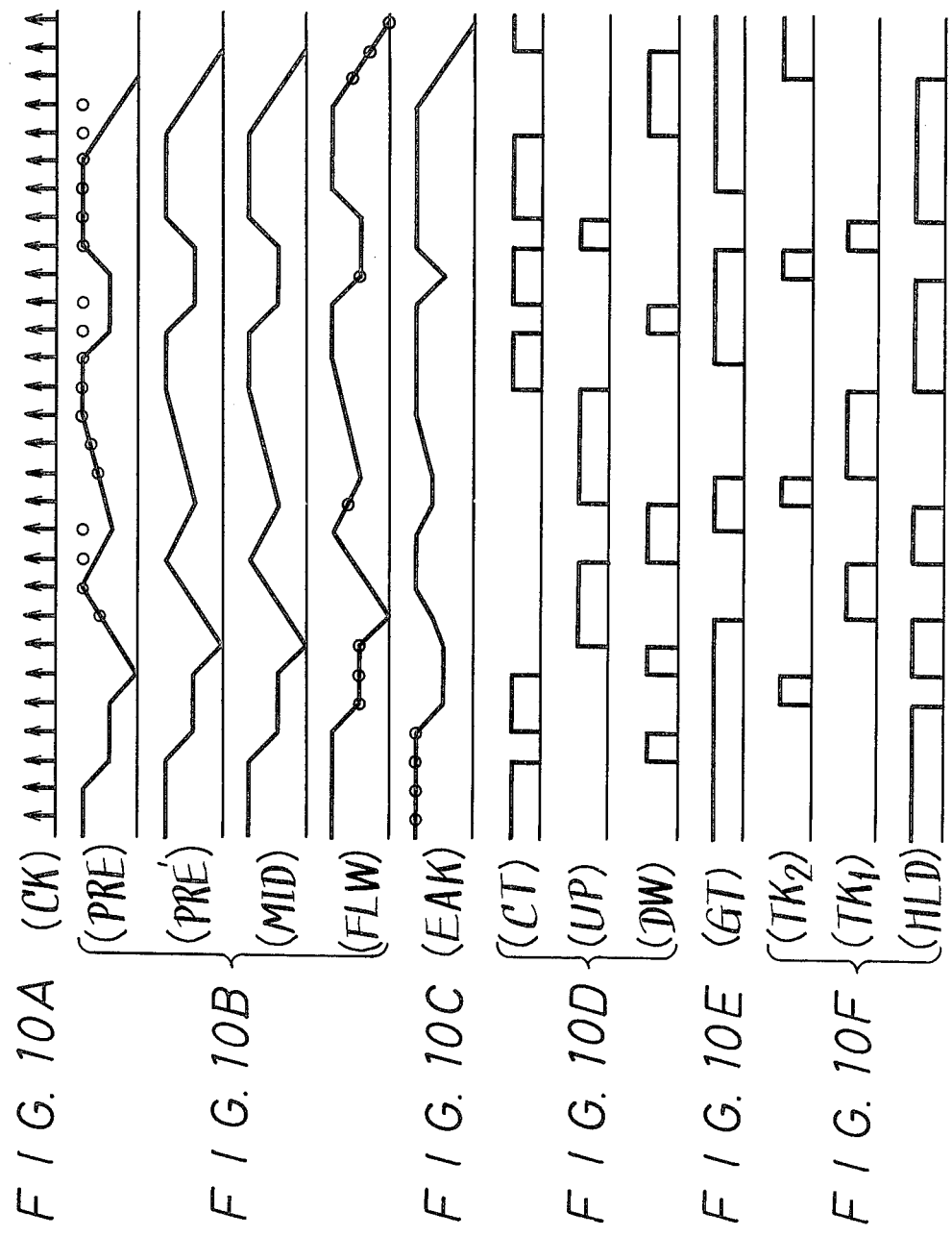
FIGS. 10A to 10F, FIGS. 11A to 11F and FIGS. 12A to 12G are timing charts, each used to explain the operation of the edge timing adjusting circuit.

By way of example, a description will be given to the expansion operation in which for the sampling clock shown in FIG. 10A, the output PRE of the latch 49, the output PRE' of the latch 53, the output MID of the latch 48 and the output FLW of the latch 51 are respectively given as shown in FIG. 10B (the waveforms in the figure indicate discrete ones formed of sampled data in analog fashion). As will be apparent from the waveforms of FIG. 10B, in the expansion operation of FIG. 10, the respective RAMs 43 and 44 are so controlled that the outputs PRE and FLW may have the advanced and delayed phase differences by one clock period for the output MID, respectively, thus resulting in the expansions of one clock period. In this case, the phase difference between the outputs PRE and FLW is two-clock periods.

The level comparator 54 level-compares the outputs PRE and PRE' with each other so as to generate the detecting signals CT, UP and DW shown in FIG. 10D, respectively. Also, in expansion, the level comparator 55 produces the detecting signal GT which becomes "H38 when the output FLW is greater than or equal to the output PRE (FLW >PRE) as shown in FIG. 10E. These detecting signals CT, UP, DW and GT are all supplied to the control logic circuit 40, in which based upon the aforementioned logical expressions, the control signals $TK_2$, $TK_1$, HLD as shown in FIG. 10F are formed. In the interval "H" of each of the control signals $TK_2$ and $TK_1$ including its rising edge, the sampled data contained in the respective waveforms of the outputs FLW and PRE are selected by the latches 52 and 50, while in the interval "H" of the control signal HLD including its rising edge, the sampled data are held previously.

The sampled data selected and held by the control signals $TK_2$, $TK_1$ and HLD shown in FIG. 10F become those shown by white circles in FIGS. 10B and 10C and hence a key signal EAK, both of the leading and trailing edges of which are expanded by one clock period for the output MID as shown in FIG. 10C is derived therefrom.

Figure 11:
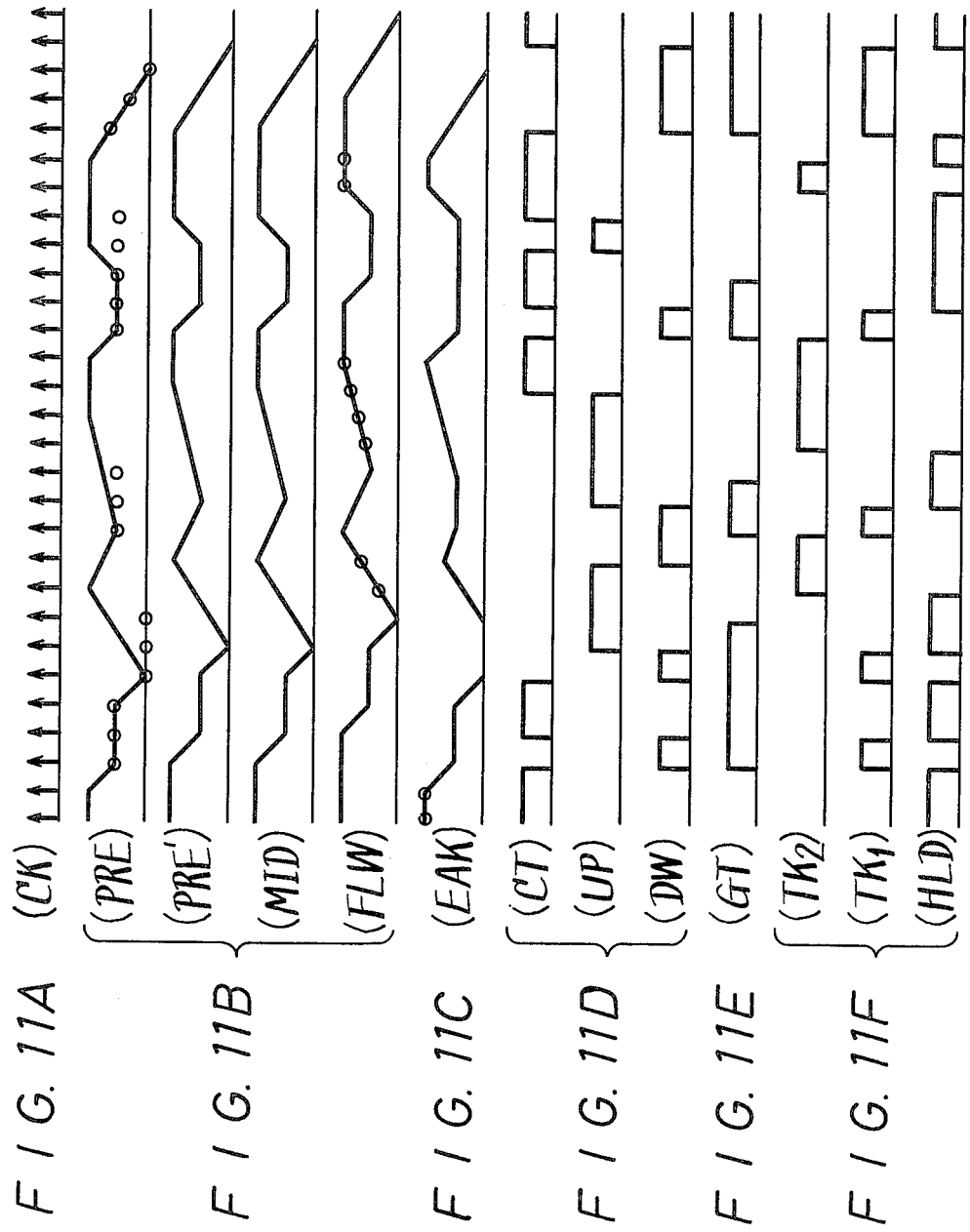

FIGS. 11A through 11F are timing charts each showing the operation to form the key signal EAK whose leading and trailing edges are both contracted by one clock period. A sampling clock CK in FIG. 11A, waveforms of the outputs PRE, PRE', MID and FLW in FIG. 11B and detecting signals CT, UP and DW in FIG. 11D are the same as those of the previously described expansion operation in FIGS. 10A, 10B and 10D. But, since the level comparator 55 is switched so as to derive a detecting signal GT as shown in FIG. 11E which becomes "H" when the output FLW is greater than the output PRE (FLW >PRE) and the logical expressions of the control logic circuit 40 are different, there are formed control signals $TK_2$, $TK_1$ and HLD as illustrated in FIG. 11F. Accordingly, the sampled data denoted by white circles in FIGS. 11B and 11C are selected and held, and hence a key signal EAK whose leading and trailing edges are both contracted by one clock period as shown in FIG. 11C can be formed.

Getting back to FIG. 9, the fine adjusting circuit or adjuster 39 will be described next. The key signal developed at the output of the latch 56 is supplied to a buffer memory 57 and RAMs 58 and 59, from which these outputs are derived through a latch 60 to the output. The buffer memory 57 and the RAMs 58 and 59 are respectively supplied as their output control signals with control signals NC, ALE and ATE, each being generated from the control logic circuit 40, from which outputs thereof appear during the period at which each of the control signals NC, ALE and ATE is "H". The RAM 58 is the table for use in conversion of the leading edge onto which the conversion data supplied from the microprocessor 21 (FIG. 3) through the I/0 controller 31 is loaded. While, the RAM 59 is the table for use in conversion of the trailing edge onto which the conversion data from the microprocessor 21 (FIG. 3) is likewise loaded. This embodiment of the invention performs the contraction as the fine adjustment, so that the conversion data is of a value provided by attenuating each sampled data of the key signal by a predetermined amount supplied from the latch 56.

Initially, when the fine adjustment is inactive, in the control logic circuit 40, the control signal ALE is "L", the control signal ATE is "L" and the control signal NC is "H", so that from the buffer memory 57 appears always at the output, which is then derived as the output of the latch 60.

When the fine adjustment is active, the logical expressions to form the control signals are different depending on whether the coarse adjustment operation of the shift and coarse adjustment circuit 38 at the previous stage is made ON or OFF. Consequently, the respective control signals are generated based upon the following logical expressions as stated below.

When the coarse adjustment is OFF,

ALE=UPD

ATE=DW·CTD+DWD·$\overline{CT}$

When the coarse adjustment is ON and the expansion operation mode is active

ALE=TK$_1$ D

ATE=TK$_2$

NC=$\overline{ALE+ATE}$

When the coarse adjustment is OFF and the contruction operation mode is active

ALE=TK$_2$ D

ATE=TK$_1$

NC=$\overline{ALE+ATE}$

In the above expressions, the respective detecting signals UPD, CTD and DWD represent the detecting signals UP, CT and DW delayed by two clock periods and the respective control signals TK$_1$ D and TK$_2$ D represent the control signals TK$_1$ and TK$_2$ in coarse adjustment delayed by one clock period.

Figure 12:
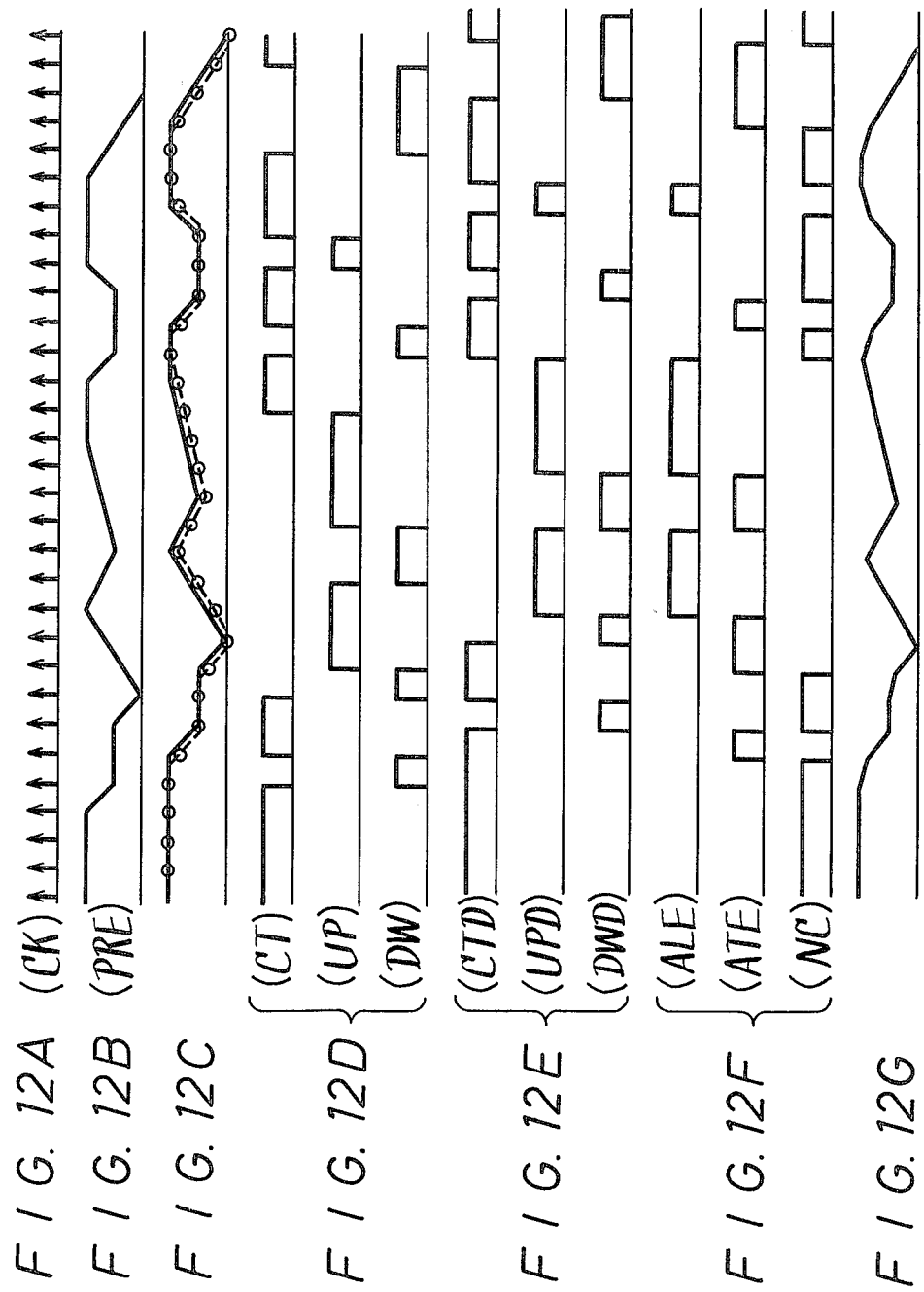

The fine adjustment operation when the coarse adjustment is OFF will be described with reference to timing charts of FIGS. 12A through 12G. FIG. 12A shows a sampling clock CK and FIG. 12B shows the key signal PRE appearing at the output of the latch 49. At the timing synchronized with that of the key signal PRE, the detecting signals CT, UP and DW shown in FIG. 12D are derived from the level comparator 54. The detecting signals CTD, UPD and DWD, namely, the detecting signals CT, UP and DW each delayed by two clock periods, are shown in FIG. 12E. The buffer memory 57, and the RAMs 58 and 59 are respectively supplied with a key signal that is, the key signal PRE delayed by the latches 50 and 56 as shown in FIG. 12C.

Although in practice the key signals respectively shown in FIGS. 12B, 12C and 12G are formed of the respective successive samples, in order to facilitate the understanding, each of them is indicated as the analog signal. Of the waveforms shown by a broken line in FIG. 12C the waveform corresponding to the leading edge represents the conversion data derived from the RAM 58 and the waveform corresponding to the trailing edge represents the conversion data derived from the RAM 59.

When the coarse adjustment is OFF, on the basis of the foregoing logical expressions, the control signals ALE, ATE and NC shown in FIG. 12F are formed. With these control signals ALE, ATE and NC, the sampled data shown by white circles in FIG. 12C are derived from any one of the buffer memory 57 and the RAMs 58 and 59, so that as shown in FIG. 12G, a key signal whose leading and trailing edges are respectively contracted during one sampling period is formed.

Further, it may be possible that by loading such data as to increase the original data (maximum value is 255 by 8 bits) as the conversion data onto the respective RAMs 58 and 59, the leading and trailing edges are expandable during one clock period.

Figure 13:
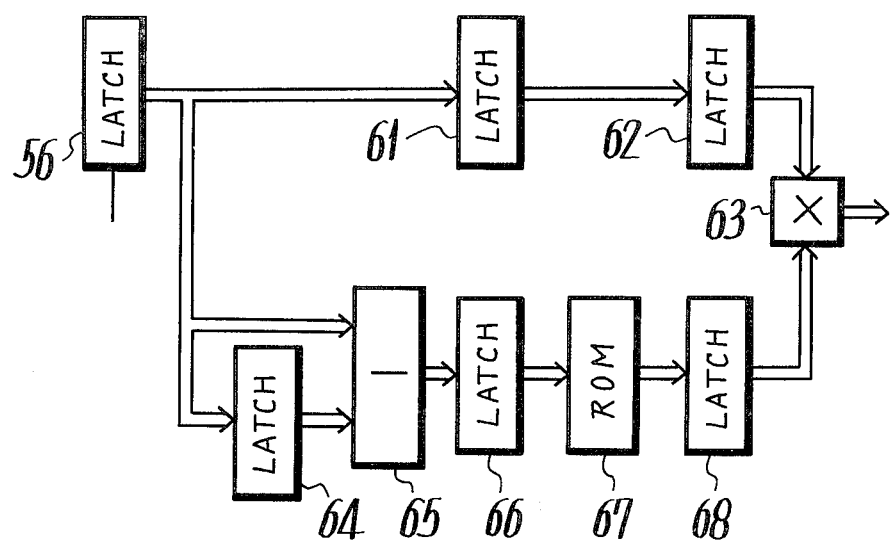
FIG. 13 and FIGS. 14A and 14B are respectively a block diagram schematically showing other embodiment of a fine adjusting circuit included in the edge timing adjusting circuit and waveform diagrams used to explain the same.

FIG. 13 is a block diagram showing another embodiment of the fine adjusting circuit or adjuster 39, in which a coefficient corresponding to the slope of the edge of the input key signal is generated by a ROM (read-only memory) 67 and this coefficient is multiplied with the respective sample of the key signal at a multiplier 63. This multiplier 63 is supplied with the key signal by way of latches 61 and 62. The slope of the edge of the key signal is detected by a latch 64 and a subtractor 65, and the detected signal is then supplied through a latch 66 to the ROM 67 as the address thereof. The coefficient derived from this ROM 67 is supplied to the multiplier 63 via a latch 68. The positive and/or negative slope of the edge is indicated by the most significant bit of the detected signal.

Figure 9:
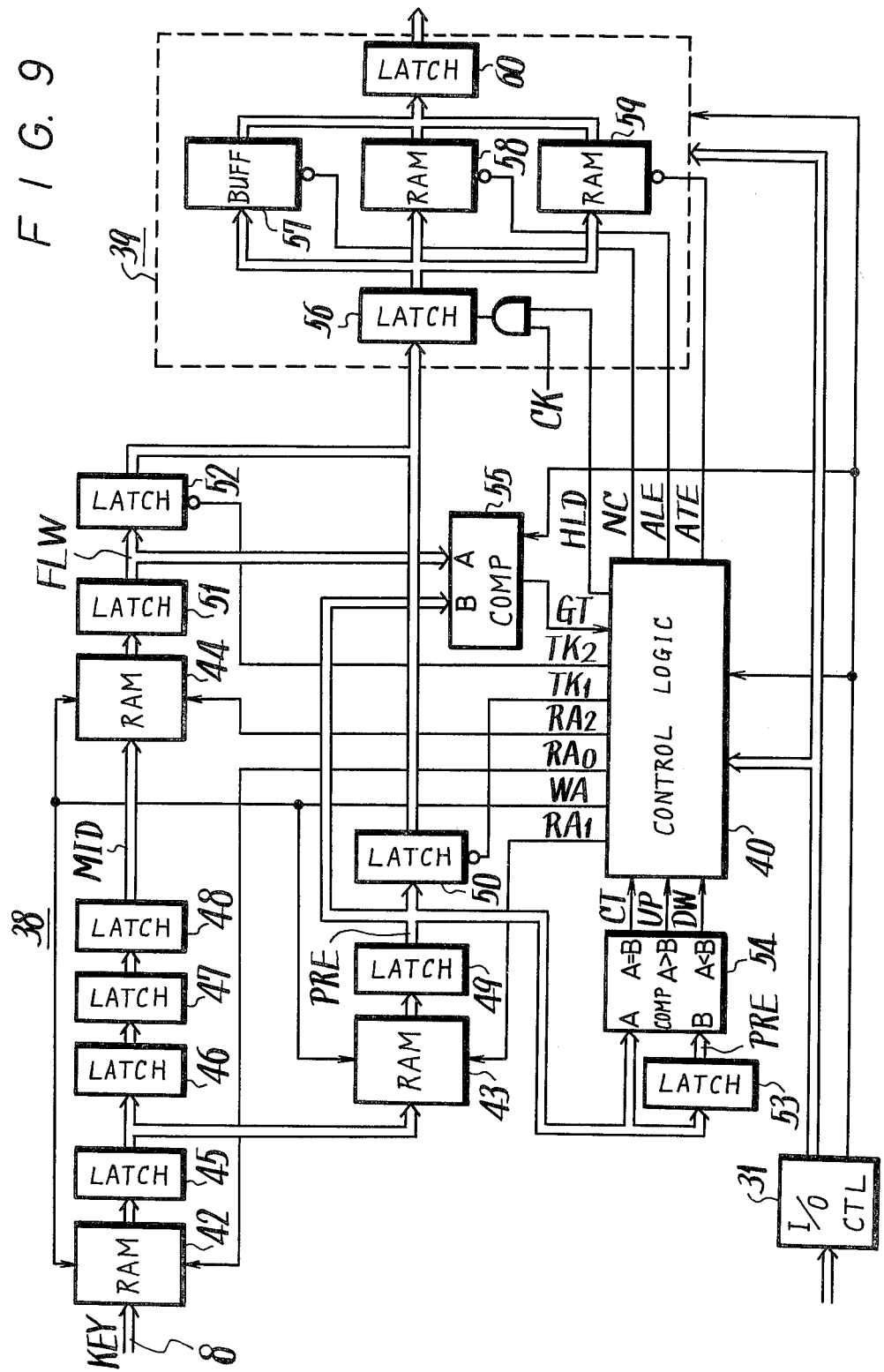
FIG. 9 is a block diagram showing one embodiment of an edge timing adjusting circuit to which the invention is applied.
Figure 14A:
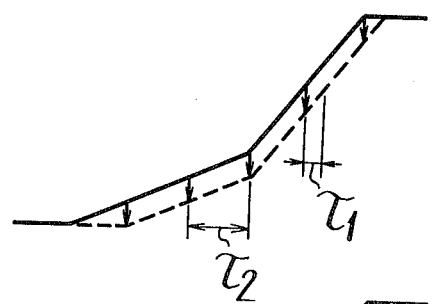
Figure 14B:
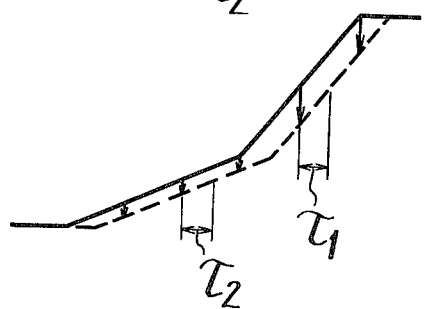

Since the fine adjusting circuit 39 of the construction shown in FIG. 9 previously described attenuates the sampled data indiscriminately by a predetermined level irrespective of the steep or gentle slope of the edge, a contracted amount $\tau_1$ where the slope is steep differs from a contracted amount $\tau_2$ where the slope is gentle so that the contracted amount $\tau_2$ is greater than the contracted amount $\tau_1(\tau_2>\tau_1)$ thus causing the contracted amounts to be scattered widely. Whereas, with the embodiment of the fine adjusting circuit 39 shown in FIG. 13, the slopes are detected and the multiplication coefficient which becomes larger if the slopes are made steeper is generated from the ROM 67, so that as shown in FIG. 14B, the contracted amount can be made constant $(\tau_1=\tau_2)$ regardless of the steepness and/or gentleness of the slope.

As will be understood from the description of the aforesaid embodiments, in accordance with the invention, like the digital key signal in the chromakey apparatus, the adjustment for expanding or contracting the timings of the edge portions corresponding to a part of the outline region of the picture by the amount some integer times the sampling period is possible.

In addition, in accordance with this invention, it is possible to independently adjust the expanding or contracting amount of the leading and trailing edges of the key signal.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

What is claimed is:

1. A digital chromakey apparatus for use in providing a single display of selected portions of first and second digital video signals, comprising means for generating a digital key signal in response to specified chroma information contained in said first digital video signal, means for mixing said first digital video signal with said second digital video signal in response to said generated digital key signal and, means for adjusting said digital key signal so as to selectively control the location in time of a leading edge and trailing edge of said digital key signal, said means for adjusting including means for detecting said leading edge and trailing edge of said digital key signal and level control means for selectively altering amplitude levels of said leading edge and trailing edge of said generated key signal in response to external commands of expansion or compression.

2. A digital chromakey apparatus according to claim 1, in which said level control means comprises a memory which stores level altering data to be read out therefrom at occurrences of said leading edge and trailing edge.

3. A digital chromakey apparatus according to claim 2, in which said memory is composed of a pair of random access memories which respectively store leading edge data and trailing edge data, said random access memories being operative in accordance with outputs of said means for detecting said leading edge and said trailing edge.

4. A digital chromakey apparatus according to claim 2, in which said means for detecting comprises time delay means for delaying said digital key signal by a predetermined time and comparator means for comparing said digital key signal and said delayed digital key signal from said delay means, an output of said comparator means indicating a time of occurrence of said leading edge and said trailing edge.

5. A digital chromakey apparatus according to claim 1, in which said means for detecting said leading edge and trailing includes means for detecting pulse edge rate of change in said digital key signal, and means for generating a coefficient relative to said digital key signal in accordance with an output of said means for detecting said pulse edge rate of change, and said level control means includes multiplier means for multiplying said generated coefficient with said digital key signal to alter said amplitude level of said digital key signal at said leading edge and trailing edge thereof in response to said external commands to expansion or compression.

6. A digital chromakey apparatus according to claim 5, in which said means for generating a coefficient comprises read only memory means containing a set of coefficients corresponding to said pulse edge rate of change, said output from said means for detecting rate of change being supplied to said read only memory as address information used to read out a corresponding coefficient therefrom.

7. A digital chromakey apparatus according to claim 1, in which said means for adjusting further includes means for forming first and second digital key signals which respectively have delay amounts corresponding to n sampling period times (n : integer), and means for selecting one of said first and second digital key signals in response to an output of said means for detecting leading and trailing edges and to said external commands for expansion or compression.

8. Apparatus for use in providing a single color video display of selected portions of a foreground color video signal and a background color video signal, comprising:

means for producing a digital key signal defining an area of a video display occupied by said foreground color video signal in respone to selected chroma information contained in said foreground color video signal and including back color data generator means receiving said foreground video signal for producing a back color data signal, and means for comparing said back color data signal and said foreground video signal and providing said digital key signal;

key signal processing means for processing said digital key signal to produce a waveform-shaped digital key signal;

color canceller means receiving said waveform-shaped digital key signal and said foreground color video signal for producing a color cancelled video signal in which said back color data signal is fed to said color canceller means for eliminating the back color video data from said foreground color video signal in response to said waveform-shaped digital key signal; and mixer means combining said color cancelled video signal and said background video signal for producing a mixed color video signal to form said signal video display.

9. Apparatus according to claim 8, in which said key signal processing means includes clipping means for adjusting the gain of said digital key signal and edge timing means for adjusting the time of occurrence of leading and trailing edges of pulses forming said digital key signal.

10. Apparatus according to claim 9, in which said clipping means includes first and second amplitude clippers having respective threshold voltages for producing two amplitude adjusted signals, and further comprising non-additive mixer means receiving said two amplitude adjusted signals and producing therefrom a digital signal formed of the larger of the values of said two amplitude adjusted signals, and selector means receiving said two amplitude adjusted signals and said digital signal produced by said non-additive mixer means and producing a selected video output signal.

11. Apparatus according to claim 10, further comprising edge timing adjusting means receiving said selected video output signal for shifting the time of occurrence of pulses of said selected video signal.

12. Apparatus according to claim 11, further comprising means for providing coarse adjustments to both the leading edge and trailing edge of pulses forming said selected video output signal.

13. Apparatus according to claim 12, further comprising means for providing fine adjustments to both leading edge and trailing edge of pulses forming said selected video output signal.

* * * * *